US012587588B2

(12) United States Patent
Lv et al.

(10) Patent No.: US 12,587,588 B2
(45) Date of Patent: Mar. 24, 2026

(54) INFORMATION PROCESSING METHOD AND APPARATUS AND DEVICE

(71) Applicant: VIVO MOBILE COMMUNICATION CO., LTD., Dongguan (CN)

(72) Inventors: Huazhang Lv, Dongguan (CN); Xiaowan Ke, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/232,321

(22) Filed: Aug. 9, 2023

(65) Prior Publication Data

US 2023/0388384 A1      Nov. 30, 2023

Related U.S. Application Data

(63) Continuation of application No. PCT/CN2022/075499, filed on Feb. 8, 2022.

(30) Foreign Application Priority Data

Feb. 10, 2021      (CN) .......................... 202110185274.2

(51) Int. Cl.
*H04L 67/141*          (2022.01)
*H04L 41/084*          (2022.01)
(Continued)

(52) U.S. Cl.
CPC .......... *H04L 67/141* (2013.01); *H04L 41/084* (2013.01); *H04L 61/4588* (2022.05); *H04W 8/26* (2013.01)

(58) Field of Classification Search
CPC . H04L 67/141; H04L 41/084; H04L 61/4588; H04W 8/26; H04W 4/02; H04W 12/72; H04W 76/10
(Continued)

(56) References Cited

U.S. PATENT DOCUMENTS 11,695,850 B2 *    7/2023    Gupta ..................... H04L 67/60
                                                                 709/201
11,956,332 B2 *    4/2024    Wang ..................... H04L 67/60
                           (Continued)

FOREIGN PATENT DOCUMENTS

CN            110198516 A        9/2019
CN            112217856 A        1/2021
                  (Continued)

OTHER PUBLICATIONS

International Search Report issued in corresponding International Application No. PCT/CN2022/075499, mailed May 7, 2022, 6 pages.

(Continued)

*Primary Examiner* — Wing F Chan
*Assistant Examiner* — John Fan
(74) *Attorney, Agent, or Firm* — IPX PLLC

(57)          ABSTRACT

An information processing method, an apparatus, and a device, are provided. The method is executed by a first communication device, and includes: sending address information of an edge configuration server. The first communication device is an Application Function (AF) or a Network Exposure Function (NEF). Sending the address information of the edge configuration server includes: sending the address information of the edge configuration server through service information of the NEF when the first communication device is the AF, or sending the address information of the edge configuration server through service information of Unified Data Management (UDM) when the first communication device is the NEF.

20 Claims, 7 Drawing Sheets

(51) Int. Cl.
*H04L 61/4588* (2022.01)
*H04W 8/26* (2009.01)

(58) Field of Classification Search
USPC ........................................................ 709/220
See application file for complete search history.

(56) References Cited

U.S. PATENT DOCUMENTS

| | | | | |
|---|---|---|---|---|
| 2020/0329008 A1* | 10/2020 | Dao | .................... | H04L 61/5007 |
| 2020/0359218 A1* | 11/2020 | Lee | ....................... | H04W 12/63 |
| 2022/0086218 A1* | 3/2022 | Sabella | ................. | H04M 15/66 |

FOREIGN PATENT DOCUMENTS

| | | | |
|---|---|---|---|
| WO | 2020197288 A1 | 10/2020 |
| WO | 2020204474 A1 | 10/2020 |

OTHER PUBLICATIONS

Convida Wireless LLC et al, "ECS address provisioning", 3GPP tsg_salwg2_arch; SA WG2 Meeting #143E e-meeting, s2-210xxxx, Jan. 2021, 2 pages.
First Office Action issued in related Chinese Application No. 202110185274.2, mailed Dec. 8, 2022, 8 pages.
Second Office Action issued in related Chinese Application No. 202110185274.2, mailed Jun. 27, 2023, 12 pages.

* cited by examiner

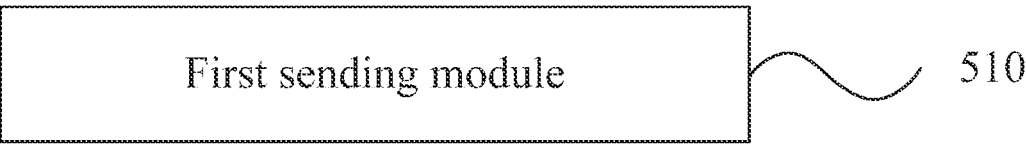
First sending module        510
FIG. 5
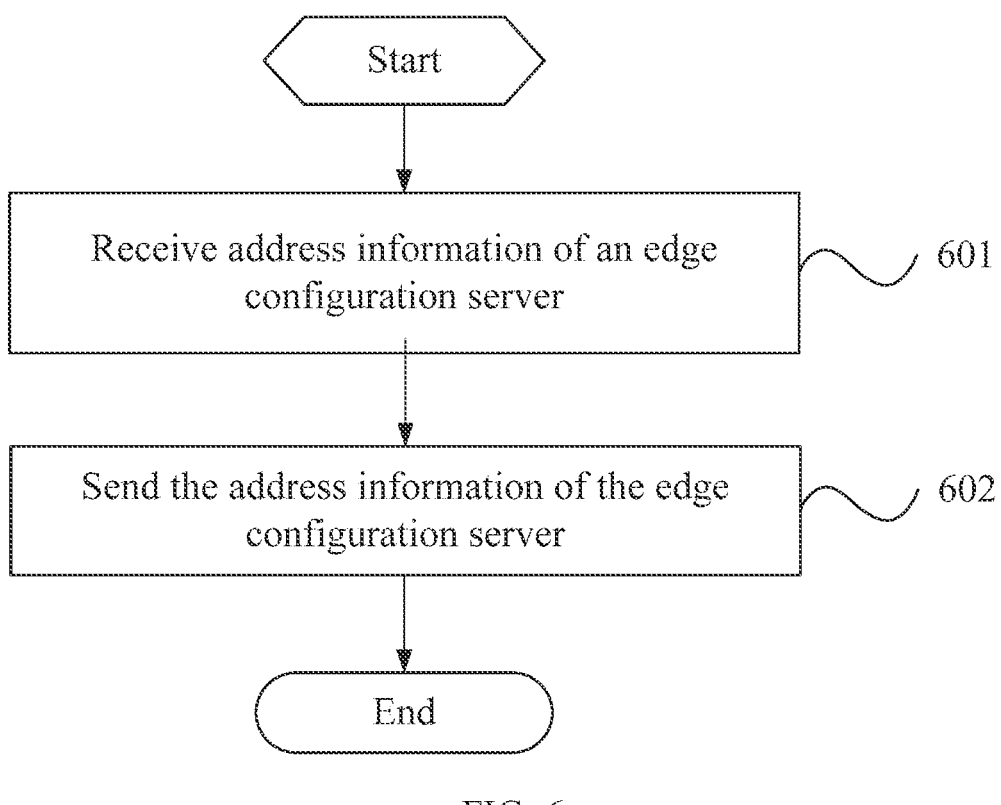
Start
Receive address information of an edge configuration server        601
Send the address information of the edge configuration server        602
End
FIG. 6
First receiving module        710
Second sending module        720
FIG. 7

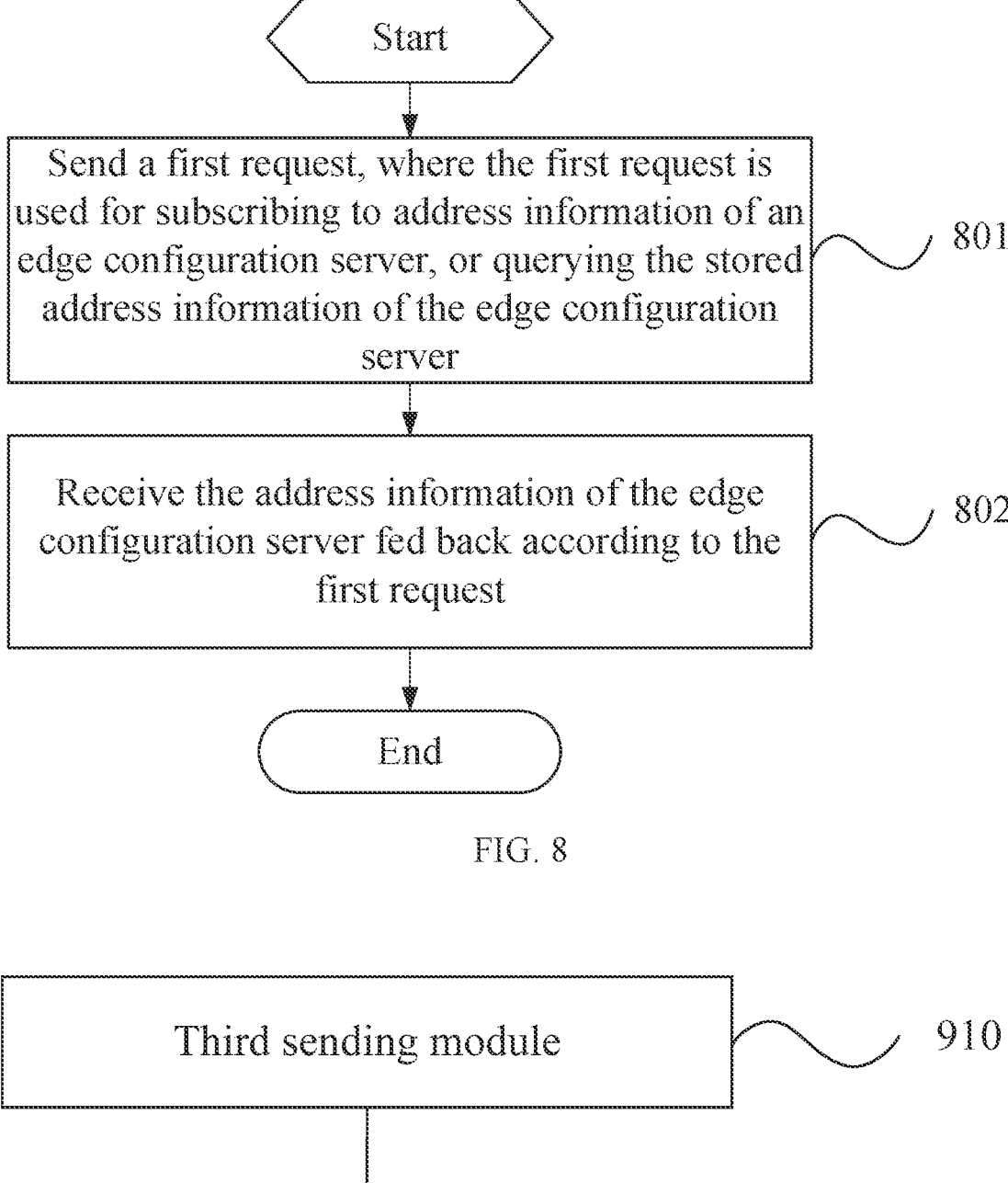

Start

Send a first request, where the first request is used for subscribing to address information of an edge configuration server, or querying the stored address information of the edge configuration server — 801

Receive the address information of the edge configuration server fed back according to the first request — 802

End

FIG. 8

Third sending module — 910

Third receiving module — 920

FIG. 9

INFORMATION PROCESSING METHOD AND APPARATUS AND DEVICE

CROSS-REFERENCE TO RELATED APPLICATIONS

This application is a continuation of International Application No. PCT/CN2022/075499, filed on Feb. 8, 2022, which claims priority to Chinese Patent Application No. 202110185274.2, filed Feb. 10, 2021. The entire contents of each of the above-identified applications are expressly incorporated herein by reference.

TECHNICAL FIELD

The present application is directed to the technical field of communication, and specifically relates to an information processing method and apparatus and a device.

BACKGROUND

In order to provide services to users, an application client of User Equipment (UE) needs to establish an application layer connection with an Edge Application Server (EAS). In an implementation, an Edge Enabler Client (EEC) of the UE finds an Edge Configuration Server (ECS), and obtains an address of the Edge Enabler Server (EES) from the ECS, and then the client interacts with the EES, obtains an address of the EAS from the EES, and finally establishes an application layer connection with the EAS. It can be seen that obtaining the address of the ECS is the first step in finding the EAS.

SUMMARY

This application discloses an information processing method and apparatus and a device.

In a first aspect, an embodiment of the present application provides an information processing method, executed by a first communication device, including:

sending address information of an edge configuration server.

In a second aspect, an embodiment of the present application provides an information processing method, executed by a second communication device, including:

receiving address information of an edge configuration server; and sending the address information of the edge configuration server.

In a third aspect, an embodiment of the present application provides an information processing method, executed by a third communication device, including:

sending a first request, where the first request is used for subscribing to address information of an edge configuration server, or querying the stored address information of the edge configuration server; and receiving the address information of the edge configuration server fed back according to the first request.

In a fourth aspect, an embodiment of the present application provides an information processing apparatus, including:

a first sending module, configured to send address information of an edge configuration server.

In a fifth aspect, an embodiment of the present application provides an information processing apparatus, including:

a first receiving module, configured to receive address information of an edge configuration server; and a second sending module, configured to send the address information of the edge configuration server.

In a sixth aspect, an embodiment of the present application provides an information processing apparatus, including:

a third sending module, configured to send a first request, where the first request is used for subscribing to address information of an edge configuration server, or querying the stored address information of the edge configuration server; and a third receiving module, configured to receive the address information of the edge configuration server fed back according to the first request.

In a seventh aspect, an embodiment of the present application provides a communication device, including a processor, a memory, and a program or an instruction stored in the memory and executable on the processor, and when the program or the instruction is executed by the processor, the steps of the method according to the first aspect, the steps of the method according to the second aspect, or the steps of the method according to the third aspect are implemented.

In an eighth aspect, an embodiment of the present application further provides a readable storage medium, where the readable storage medium stores a program or an instruction, and when the program or the instruction is executed by a processor, the steps of the method according to the first aspect, the steps of the method according to the second aspect, or the steps of the method according to the third aspect are implemented.

In a ninth aspect, an embodiment of the present application provides a chip, the chip includes a processor and a communication interface, the communication interface is coupled to the processor, and the processor is used to run programs or instructions, so as to implement the method according to the first aspect, the method according to the second aspect, or the method according to the third aspect.

According to a tenth aspect, a computer program product is provided, stored in a non-transient storage medium, where the computer program product is executed by at least one processor to implement the method according to the first aspect, the method according to the second aspect, or the method according to the third aspect.

In an eleventh aspect, a communication device is provided, configured to implement the method according to the first aspect, the method according to the second aspect, or the method according to the third aspect.

In this way, in the embodiments of the present application, the address information of the ECS is sent to the second communication device, so that even if an ECS is deployed according to a region or an ECS is provided by a third party, the UE can establish an application layer connection with the ECS based on the address information of the ECS provided by the first communication device, so that the ECS obtains the address of the EES, and then the UE establishes an application layer connection with the EES, interacts to obtain the address of the EAS, and establishes an application layer connection.

BRIEF DESCRIPTION OF DRAWINGS

FIG. 5 is a structural diagram of an apparatus corresponding to the information processing method in FIG. 2 according to an embodiment of the present application;

FIG. 6 is a flowchart of an information processing method according to an embodiment of the present application;

FIG. 7 is a structural diagram of an apparatus corresponding to the information processing method in FIG. 6 according to an embodiment of the present application;

FIG. 8 is a flowchart of an information processing method according to an embodiment of the present application;

FIG. 9 is a structural diagram of an apparatus corresponding to the information processing method in FIG. 8 according to an embodiment of the present application;

DETAILED DESCRIPTION

The following describes the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts shall fall within the protection scope of this application.

The terms "first," "second," and the like in the description and the claims of this application are used to distinguish between similar objects instead of describing a specific order or sequence. It should be understood that, data termed in such a way is interchangeable in proper circumstances, so that the embodiments of this application can be implemented in an order other than the order illustrated or described herein. In addition, in the specification and claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communication systems such as Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, a New Radio (NR) system is described below as an example, and the term NR is used in most of the descriptions, although these technologies can also be used in an application other than an application of the NR system, for example, a 6' Generation (6G) communication system.

Figure 1:
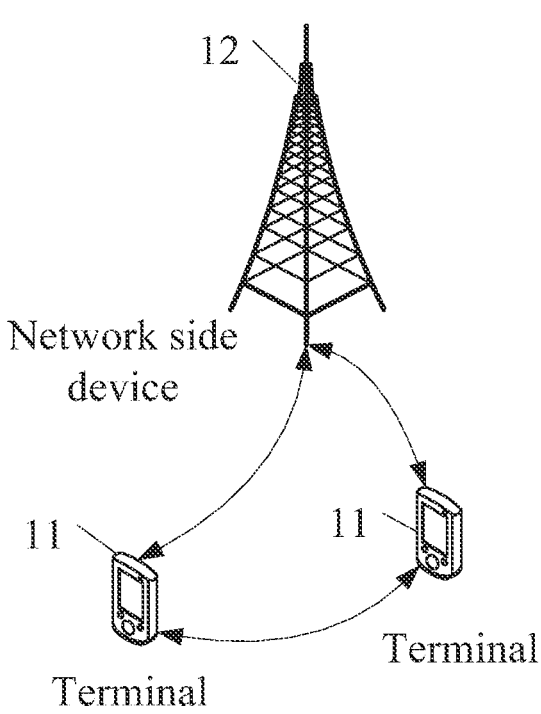
FIG. 1 is a block diagram of a wireless communications system according to an embodiment of the present application.

FIG. 1 is a block diagram of a wireless communications system to which an embodiment of this application can be applied. The wireless communications system includes a terminal 11 and a network side device 12. The terminal 11 may also be called a terminal device or User Equipment (UE), and the terminal 11 may be a mobile phone, a Tablet Personal Computer (TPC), a laptop computer or a notebook computer, a Personal Digital Assistant (PDA), a palmtop computer, a netbook, an Ultra-Mobile Personal Computer (UMPC), a Mobile Internet Device (MID), a wearable device or a Vehicle User Equipment (VUE), a Pedestrian User Equipment (PUE), and other terminal side devices. The wearable device includes: bracelets, earphones, glasses, etc. It should be noted that a specific type of the terminal 11 is not limited in this embodiment of this application. The network side device 12 may be a base station or a core network. The base station may be referred to as a node B, an evolved node B, an access point, a Base Transceiver Station (BTS), a radio base station, a radio transceiver, a Basic Service Set (BSS), an Extended Service Set (ESS), a node B, an evolved node B (eNB), a home node B, a home evolved node B, a Wireless Local Area Networks (WLAN) access point, a Wireless Fidelity (WiFi) node, a Transmitting Receiving Point (TRP), or other appropriate terms in the art. As long as a same technical effect is achieved, the base station is not limited to a specified technical term. It should be noted that, in embodiments of the present application, only a base station in the NR system is used as an example, but a specific type of the base station is not limited.

With reference to the accompanying drawings, the following describes in detail the information processing method in the embodiments of this application based on specific embodiments and application scenarios.

Figure 2:
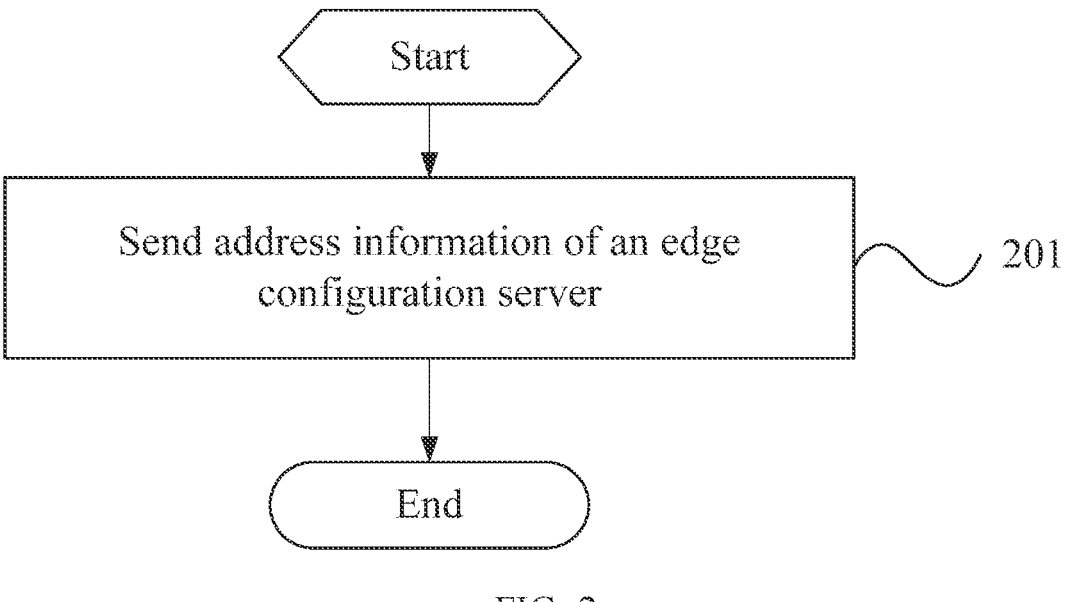
FIG. 2 is a flowchart of an information processing method according to an embodiment of the present application.

As shown in FIG. 2, an information processing method in the embodiments of the present application is executed by the first communication device, including:

Step 201: Send address information of an edge configuration server.

The first communication device executes step 201, so that the address information of the ECS is sent to a second communication device, so that even if an ECS is deployed according to a region or an ECS is provided by a third party, the UE can establish an application layer connection with the ECS based on the address information of the ECS provided by the first communication device, so that the ECS obtains the address of the EES, and then the UE establishes an application layer connection with the EES, interacts to obtain the address of the EAS, and establishes an application layer connection. In some implementations, step 201 includes:

sending the address information of the edge configuration server according to location information of the user equipment and/or change of the location information of the user equipment.

In this way, based on the location information of the UE, the first communication device can provide the UE with the address information of the ECS that can provide services for the UE.

In some implementations, before step 201, the method further includes: subscribing to the location information of the user equipment.

Herein, the first communication device learns of the location of the UE in time by subscribing to the location information of the UE, so as to provide the UE with applicable address information of the ECS (ECS address information).

The address information of the edge configuration server includes at least one of the following:

a Fully Qualified Domain Name (FQDN) of the edge configuration server;

an Internet Protocol (IP) address of the edge configuration server;

a port number of the edge configuration server; and a Uniform Resource Locator (URL) of the edge configuration server.

The location information of the user equipment includes at least one of the following:

a DN Access Identifier (DNAI);

a Cell IDentifier (Cell ID); and a Tracking Area Identity (TAI).

In some implementations, the first communication device is an Application Function (AF) or a Network Exposure Function (NEF).

The sending address information of the edge configuration server includes: sending the address information of the edge configuration server through service information of the NEF in a case that the first communication device is an AF; or sending the address information of the edge configuration server through service information of Unified Data Management (UDM) in a case that the first communication device is an NEF.

That is, the first communication device may be an AF or an NEF. When the AF executes step 201, the address information of the ECS is sent to the NEF through the service information of the NEF. Herein, the service information of the NEF includes at least one of the following: Nnef_ServiceParameter_Update; Nnef_Service Parameter_Create; Nnef_ParameterProvision_Create; and Nnef_ParameterProvision_Update.

That is, the AF sends the service information of the NEF to the NEF, where the service information of the NEF includes address information of the ECS.

If the AF request is authorized by the NEF and can provide parameters, the NEF requests to generate, update, or save the provided address information of the ECS, and sends this information to a UDM and/or a Unified Data Repository (UDR) as a part of subscription data. The NEF executes step 201, and sends the address information of the ECS to the UDM through the service information of the UDM. The service information of the UDM includes at least one of the following: Nudm_ParameterProvision_Create and Nudm_ParameterProvision_Update.

That is, the NEF sends the service information of the UDM to the UDM, where the service information of the UDM includes address information of the ECS.

In addition, the AF can further send service information of the NEF such as Nnef_ParameterProvision_Delete, which includes the address information of the ECS, to delete the address information of the ECS in the subscription information stored in the UDM. Similarly, the NEF can send service information of the UDM such as Nudm_Parameter-Provision_Delete, which includes the address information of the ECS. If the AF is authorized by the UDM and can provide parameters, the address information of the ECS is provided to the UDR through the service information of the unified data repository UDR, or the data in the UDR is updated, or the data in the UDR is deleted. Herein, the service information of the UDR including the address information of the ECS includes at least one of the following: Nudr_DM_Create; Nudr_DM_Update; and Nudr_DM_Delete.

In addition, the NEF executes step 201, and can also send an AF request carrying the address information of the ECS to the UDR.

The NEF executes step 201, and sends the address information of the ECS to the UDR through the service information of the UDR. The service information of the UDM includes at least one of the following: Nudr_DM_Create and Nudr_DM_Update.

That is, the NEF sends the service information of the UDR to the UDR, where the service information of the UDR includes address information of the ECS.

In some implementations, the second communication device is: an NEF, a UDM, or a UDR.

In this embodiment, after receiving the address information of the ECS, the UDR and the UDM can send the address information of the ECS to the third communication device. The third communication device may send the first request in advance to obtain the address information of the ECS or subscribe to the ECS address, that is, the second communication device feeds back the address information of the ECS according to the first request.

The first request may be a request for querying the address information of the ECS, or a request for subscribing to the address information of the ECS, that is, the first request is used for subscribing to the address information of the edge configuration server, or querying the stored address information of the edge configuration server.

When the first request is a query request, the second communication device sends corresponding address information of the ECS according to the query request. For example, the Session Management Function (SMF) as the third communication device sends a query request (including UE location information) to the UDM (the second communication device), and the UDM feeds back, according to the information in the query request, the address information of the ECS corresponding to the UE location information to the SMF. The query request uses the service information of the UDM, including at least one of the following: Nudm_UECM_Get.

For example, the Policy Control Function (PCF) as the third communication device sends a query request (including UE location information) to the UDR (the second communication device), and the UDR feeds back the address information of the ECS corresponding to the UE location information to the PCF. The query request uses service information of the UDR, including at least one of the following: Nudr_DM_Query. In some implementations, the UDM sends a query request to the UDR, where the query request uses service information of the UDR, including at least one of the following: Nudr_DM_Query. Usually, the query request includes at least one of the following: Data Set Identifier; Data Key(s): Data Subset Identifier(s); and Data Sub Key(s).

When the first request is a subscription request, the second communication device sends corresponding address information of the ECS according to the subscription request, and the subscription request includes at least one of address information of the ECS and UE location information. In some implementations, the subscription request includes at least one of the following: Nudr_DM_Subscribe and Nudm_SDM_Subscribe. For example, the SMF (the third communication device) sends a subscription request to subscribe to the notification of the UDM (the second communication device), and subscription content is subscription data of the address information of the ECS of the UE and/or UE group. Therefore, after receiving the address information of the ECS provided by the AF or the updated address information of the ECS, the UDM sends the information to the SMF. In some implementations, the UDM sends Nudm_SDM_Notification including the address information of the ECS to the SMF. The PCF can receive, through subscription, the notification sent by UDR, and the notification includes the changed address information of the ECS. The notification sent by the UDR to the PCF is implemented through the following signaling: Nudr_DM_Notify.

In some implementations, for the received subscription request, the second communication device may perform at least one of the following:

sending all currently known address information of the ECS when receiving the subscription request;

sending, when receiving the subscription request, the address information of the ECS that matches the subscription request, where the address information of the ECS matches UE location information in the subscription request;

after receiving the subscription request, when the address information of the ECS changes, sending the changed address information of the ECS; and after receiving the subscription request, when the location information of the UE changes, sending the address information of the ECS that matches a current location of the UE.

In this embodiment, after receiving the address information of the ECS, the second communication device is further configured to: store the received address information of the ECS. In some implementations, the address information of the ECS is carried by the AF request, the first communication device sends the AF request, and the second communication device stores the AF request when receiving the AF request, and sends the AF request to forward the address information of the ECS in the AF request. The signaling used to store the AF request includes at least one of the following: Nudr_DataManagement_Create and Nudr_DataManagement_Update.

In this embodiment, after the PCF obtains the address information of the ECS, the PCF determines the rule (URSP rules) for the UE Route Selection Policy (URSP). The URSP rules include at least one of the following: a Data Network Name (DNN); Single Network Slice Selection Assistance Information (S-NSSAI); and address information of the ECS. The URSP rules are used for at least one of the following: matching application traffic from a client of the user equipment to the ECS; establishing a Protocol Data Unit (PDU) session from the client of the user equipment to the ECS; and establishing an application connection from the client of the user equipment to the ECS. Herein, an implementation of the client of the user equipment is an EEC. After the PCF determines the URSP rules, the PCF sends the URSP rules to the UE through the process of UE policy delivery.

The UE deployed with the EEC should have an enhanced kernel capability, that is, the UE supports sending, to the application client of the UE, information obtained from the Non-Access Stratum (NAS) or the Access Stratum (AS).

After the UE obtains URSP rules, when the EEC deployed on the UE needs to initiate an application connection with the ECS, the following operations are performed:

Case 1: When the EEC wants to initiate application layer communication to the ECS, the UE currently has a PDU session, and the ECS IP address of the application layer service is the same as the destination IP in a traffic descriptor in the URSP rules corresponding to the current PDU session, the PDU session is directly matched and this session is used to carry the application layer communication from the EEC to the ECS.

Case 2: When the EEC wants to initiate application layer communication to the ECS, and the UE currently does not have any PDU session, or no destination IP in the traffic descriptor in the URSP rules corresponding to any PDU session is the same as the destination IP of application layer communication that needs to be established, that is, the address of the ECS, the EEC uses the information in the URSP rules including the address information of the ECS, to establish a connection and/or a PDU session to the destination IP address (the IP of the address of the ECS).

In this embodiment, if the SMF obtains all address information of the ECS from the UDM and the address information of the ECS has a mapping relationship with different DNAIs, after the SMF obtains all the address information of the ECS, the SMF can query, according to the change of the location of the UE and the mapping relationship between the address information of the ECS and the DNAIs, the address information of the ECS corresponding to the location of the UE, and deliver the address information of the ECS.

In some implementations, each address information of the ECS is associated with one or more DNAIs. For example, DNAI1 is associated with ECS address1; and DNAK is associated with ECS address2. Therefore, the method also includes: sending a DNAI corresponding to the address information of the ECS.

In this way, when the first network device provides the address information of the ECS, the first network device also provides the corresponding DNAI.

Figure 3:
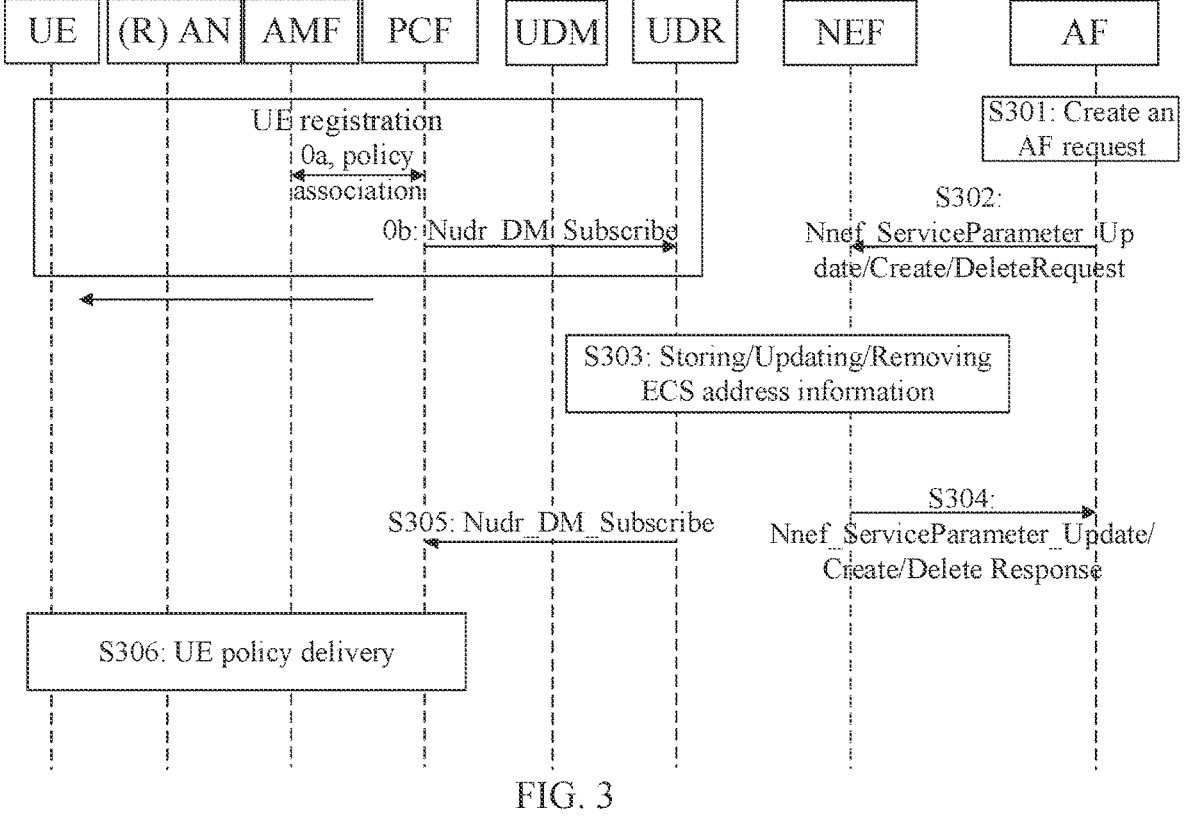
FIG. 3 is a schematic diagram of an application of an information processing method according to an embodiment of the present application.

In the following, the application of the method in the embodiment of the present application will be described in combination with specific scenarios:

Scenario 1: Refer to FIG. 3. S301: An AF subscribes to the location information of the UE. The AF creates an AF request, and/or the AF creates an AF request according to the current location information of the UE and/or the change of the location of the UE, and provides the address information of the ECS that can provide services for the UE.

S302: The AF triggers service information of the NEF, including generation, update, and deletion of parameters, which is Nnef_ServiceParameter_Update, Nnef_ServiceParameter_Create, and Nnef_ServiceParameter_Delete Request. The address information of the ECS is provided as one of the parameters of the above service information.

S303: The NEF provides the AF request (including address information of the ECS) and UDR Storing/Updating/Removing ECS address information to the UDR, which correspond to: Nudr_DM_Create; Nudr_DM_Update; and Nudr_DM_Delete. The UDR can save the address information of the ECS, where the address information of the ECS is stored in the UDR as application data. Data Subset in the UDR is set to "Service specific information".

S304: The UDR replies with an AF response, namely, Nnef_ServiceParameter_Update, Nnef_Service Parameter_Create, and Nnef_ServiceParameter_Delete Response.

S305: The UDR notifies the PCF of the changed address information of the ECS in the form of notify, for example, sends Nudr_DM_Notify. The precondition is that the PCF subscribes to the change of the address information of the ECS from the UDR through a subscription request such as Nudr_DM_Subscribe after conducting policy association with the Access and Mobility management Function (AMF) during the UE registration process. When the address information of the ECS serving the UE changes, the PCF is notified.

S306: The PCF obtains a new ECS address from notify sent by the UDR, determines to generate corresponding URSP rules according to the address, and sends the rules to the UE through the process of UE policy delivery.

Figure 4:
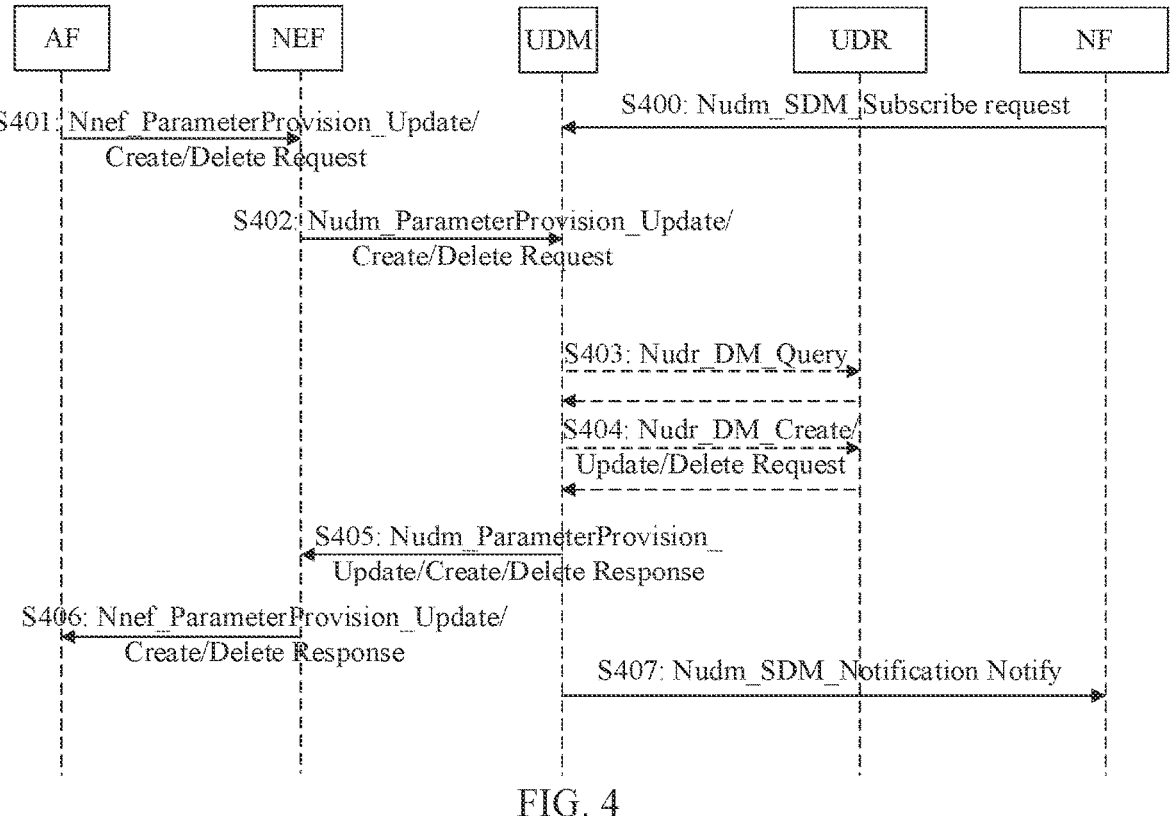
FIG. 4 is a schematic diagram of another application of an information processing method according to an embodiment of the present application.

Scenario 2: FIG. 4 shows the precondition. S400: The NF network function (for example, the SMF) initiates a subscription request to the UDM, that is, Nudm_SDM_Subscribe, to subscribe to the ECS address that provides services for the UE.

S401: The AF provides address information of the ECS, or updates the address information of the ECS for the NEF. The service information of the NEF is used, which is Nnef_ParameterProvision_Update, Nnef_ParameterProvision_Create, and Nnef_ParameterProvision_Delete Request.

S402: If the AF is authorized by the NEF and can provide parameters, the NEF requests to generate, update, save, or delete the provided address information of the ECS, and sends this information to the UDM as a part of subscription data. The service information of the UDM is used, which is Nudm_ParameterProvision_Update, Nudm_ParameterProvision_Create, and Nudm_ParameterProvision_Delete Request.

S403: The UDM can read the address information of the ECS from the UDR through Nudr_DM_Query. In this way, the corresponding subscription information is determined to verify the data update of the required address information of the ECS.

S404: If the AF is authorized by the UDM and can provide parameters, the UDM provides the address information of the ECS to the UDR, or updates the data in the UDR. The service information of the UDR is used, such as Nudr_DM_Create, Nudr_DM_Update, and Nudr_DM_Delete Request, including the address information of the ECS.

S405: The UDM replies with an AF response, namely, Nudm_ParameterProvision_Update, Nudm_ParameterProvision_Create, and Nudm_ParameterProvision_Delete Response.

S406: The NEF replies with an AF response, namely, Nnef_ParameterProvision_Update, Nnef_ParameterProvision_Create, and Nnef_ParameterProvision_Delete Response.

S407: If the address information of the ECS is provided successfully, the UDM notifies the network element subscribing to the address information of the ECS, such as the SMF. The UDM sends the address information of the ECS provided by the AF or the updated address information of the ECS to the SMF through Nudm_SDM_Notification Notify.

The content sent by the UDM to the SMF includes the following cases:

Case 1: The SMF sends location information (mainly DNAI) of the UE during the subscription phase, and the UDM queries the corresponding address information of the ECS according to the location information of the UE, and feeds back the information.

Case 2: In the subscription phase, the SMF subscribes to the address information of the ECS according to the DNAI. When the location of the UE changes and the DNAI changes, the UDM returns, to the SMF, the ECS address corresponding to the DNAI of the location of the UE. Each change of the location of the UE may trigger the delivery of address information of the ECS once.

Case 3: In the subscription phase, the SMF directly subscribes to all address information of the ECS from the UDM, and then the UDM directly sends, to the SMF in the form of a mapping table, all the ECS addresses associated with each DNAI. After the SMF obtains the table, the SMF can deliver the address information of the ECS according to the change of the UE location.

To sum up, in the method of the embodiment of the present application, the address information of the ECS is sent to the second communication device, so that even if the ECS is deployed in different regions or the ECS is provided by a third party, matched address information of the ECS can be provided according to the location of the UE.

It should be noted that the information processing method provided in the embodiments of this application may be performed by an information processing apparatus, or a control module that is in the information processing apparatus and that is configured to perform and load the information processing method. In the embodiments of this application, that the information processing apparatus performs and loads the information processing method is used as an example to describe the information processing method provided in the embodiments of this application.

As shown in FIG. 5, an information processing apparatus according to an embodiment of the present application includes: a first sending module 510, configured to send address information of an edge configuration server.

In some implementations, the first transmitting module is further configured to: send the address information of the edge configuration server according to location information of the user equipment and/or change of the location information of the user equipment.

In some implementations, the apparatus further includes: a location determining module, configured to determine the location information of the user equipment and/or the change of the location information of the user equipment. In this way, the first sending module may subsequently send the address information of the edge configuration server according to the location information of the user equipment and/or the change of the location information of the user equipment.

In some implementations, the apparatus further includes: a subscription module, configured to subscribe to the location information of the user equipment.

In some implementations, the first communication device is an AF or an NEF: and the first sending module is further configured to: send the address information of the edge configuration server through service information of the NEF in a case that the first communication device is an AF; or send the address information of the edge configuration server through service information of UDM in a case that the first communication device is an NEF.

In some implementations, the address information of the edge configuration server includes at least one of the following:

a fully qualified domain name of the edge configuration server;

an Internet Protocol address of the edge configuration server;

a port number of the edge configuration server; and a uniform resource locator of the edge configuration server.

In some implementations, the location information of the user equipment includes at least one of the following:

a data network access identifier;

a cell identifier; and a tracking area identifier.

In some implementations, the apparatus further includes:

a fourth sending module, configured to send a data network access identifier corresponding to the address information of the edge configuration server.

The apparatus sends the address information of the ECS and/or the data network access identifier mapped with the address information of the ECS to the second communication device. In this way, even if an ECS is deployed according to a region or an ECS is provided by a third party, the UE can establish an application layer connection with the ECS based on the address information of the ECS provided by the first communication device, so that the ECS obtains the address of the EES, and then the UE establishes an application layer connection with the EES, interacts to obtain the address of the EAS, and establishes an application layer connection.

The information processing apparatus provided in the embodiments of the present application can implement various processes implemented by the first communication device in the method embodiments in FIG. 2 to FIG. 4, and details are not repeated here to avoid repetition.

As shown in FIG. 6, the information processing method of the embodiment of the present application is executed by the second communication device, including:

Step 601: Receive address information of an edge configuration server.

Step 602. Send the address information of the edge configuration server.

The second communication device receives the address information of the ECS sent by the first communication device, and sends the information to the third communication device. In this way, even if an ECS is deployed according to a region or an ECS is provided by a third party, the UE can establish an application layer connection with the ECS based on the address information of the ECS provided by the first communication device, so that the ECS obtains the address of the EES, and then the UE establishes an application layer connection with the EES, interacts to obtain the address of the EAS, and establishes an application layer connection.

In some implementations, before sending the address information of the edge configuration server, the method further includes: receiving a first request, where the first request is used for subscribing to address information of an edge configuration server, or querying the stored address information of the edge configuration server.

In some implementations, the first request is a query request; and the sending address information of the edge configuration server includes: sending the address information of the edge configuration server according to the query request.

In some implementations, the first request is a subscription request, and the subscription request is used for subscribing to address information of the edge configuration server; and the subscription request includes at least one of the following: the address information of the edge configuration server; and location information of user equipment.

In some implementations, the sending the address information of the edge configuration server includes at least one of the following:

sending all currently known address information of the edge configuration server when receiving the subscription request;

sending, when receiving the subscription request, the address information of the edge configuration server that matches the subscription request, where the matching subscription request is matching location information of the user equipment in the subscription request;

after receiving the subscription request, when the address information of the edge configuration server changes, sending the changed address information of the edge configuration server; and after receiving the subscription request, when the location information of the user equipment changes, sending the address information of the edge configuration server that matches a current location of the user equipment.

In some implementations, each address information of the edge configuration server is associated with a data network access identifier.

In some implementations, the receiving the address information of the edge configuration server includes:

receiving an AF request, where the AF request carries the address information of the edge configuration server; and the sending address information of the edge configuration server includes: sending the AF request.

In some implementations, after receiving the address information of the edge configuration server, the method further includes: storing the received address information of the edge configuration server.

It should be noted that the methods in the embodiments of the present application is implemented in cooperation with the above-mentioned information processing methods executed by the first communication device, and the implementation method of the above-mentioned embodiment of the information processing method executed by the first communication device is applicable to this method, and the same technical effect can also be achieved.

It should also be noted that, the information processing method provided in the embodiments of the present application may be executed by an information processing apparatus, or a control module in the information processing apparatus for executing the information processing method. In the embodiments of this application, that the information processing apparatus performs and loads the information processing method is used as an example to describe the information processing method provided in the embodiments of this application.

As shown in FIG. 7, an information processing apparatus according to an embodiment of the present application includes:

a first receiving module 710, configured to receive address information of an edge configuration server; and a second sending module 720, configured to send the address information of the edge configuration server.

In some implementations, the apparatus further includes:

a second receiving module, configured to receive a first request, where the first request is used for subscribing to address information of an edge configuration server, or querying the stored address information of the edge configuration server.

In some implementations, the first request is a query request; and the second sending module is further configured to:

send the address information of the edge configuration server according to the query request.

In some implementations, the first request is a subscription request, and the subscription request is used for subscribing to address information of the edge configuration server; and the subscription request includes at least one of the following:

the address information of the edge configuration server; and location information of user equipment.

In some implementations, the second sending module is further configured to perform at least one of the following:

send all currently known address information of the edge configuration server when receiving the subscription request;

send, when receiving the subscription request, the address information of the edge configuration server that matches the subscription request, where the matching subscription request is matching location information of the user equipment in the subscription request;

after receiving the subscription request, when the address information of the edge configuration server changes, send the changed address information of the edge configuration server; and after receiving the subscription request, when the location information of the user equipment changes, send the address information of the edge configuration server that matches a current location of the user equipment.

In some implementations, each address information of the edge configuration server is associated with a data network access identifier.

In some implementations, the first receiving module is further configured to receive an AF request, where the AF request carries address information of the edge configuration server; and the second sending module is further configured to send the AF request.

In some implementations, the apparatus further includes:

a storage module, configured to store the received address information of the edge configuration server.

After receiving the address information of the ECS sent by the first communication device, the apparatus sends the address information to the third communication device, so that even if an ECS is deployed according to a region or an ECS is provided by a third party, the UE can establish an application layer connection with the ECS based on the address information of the ECS provided by the first communication device, so that the ECS obtains the address of the EES, and then the UE establishes an application layer connection with the EES, interacts to obtain the address of the EAS, and establishes an application layer connection.

The information processing apparatus provided in the embodiments of the present application can implement various processes implemented by the second communication device in the method embodiments in FIG. 3, FIG. 4, and FIG. 6, and details are not repeated here to avoid repetition.

As shown in FIG. 8, an information processing method in the embodiment of the present application is executed by a third communication device, including:

Step 801: Send a first request, where the first request is used for subscribing to address information of an edge configuration server, or querying the stored address information of the edge configuration server.

Step 802: Receive the address information of the edge configuration server fed back according to the first request.

The third communication device sends the first request to the second communication device, and receives the address information of the ECS fed back by the second communication device according to the first request. In this way, even if an ECS is deployed according to a region or an ECS is provided by a third party, the UE can establish an application layer connection with the ECS based on the address information of the ECS provided by the first communication device, so that the ECS obtains the address of the EES, and then the UE establishes an application layer connection with the EES, interacts to obtain the address of the EAS, and establishes an application layer connection.

In some implementations, the third communication device is a Policy Control Function (PCF); and after the receiving the address information of the edge configuration server fed back according to the first request, the method further includes:

determining a rule for a user equipment routing policy, where the user equipment routing policy is used for at least one of the following:

matching application traffic from a client of the user equipment to the edge configuration server;

establishing a protocol data unit session from the client of the user equipment to the edge configuration server; and establishing an application connection from the client of the user equipment to the edge configuration server.

In some implementations, the rule for the user equipment routing policy includes at least one of the following:

a Data Network Name (DNN);

S-NSSAI; and address information of the edge configuration server.

In some implementations, after the determining a rule for a user equipment routing policy, the method further includes: sending the rule for the user equipment routing policy to the user equipment.

In some implementations, the user equipment has an enhanced kernel capability; where the enhanced kernel capability indicates that the user equipment supports sending, to an application client on the user equipment, information obtained from a Non-Access Stratum (NAS) or an Access Stratum (AS).

In some implementations, before the determining a rule for a user equipment routing policy, the method further includes:

receiving an AF request, where the AF request carries the address information of the edge configuration server.

In some implementations, the third communication device is a Session Management Function (SMF); and after the receiving the address information of the edge configuration server fed back according to the first request, the method further includes.

sending the address information of the edge configuration server to the user equipment.

It should be noted that the methods in the embodiments of the present application is implemented in cooperation with the above-mentioned information processing methods executed by the first communication device and the second communication device, the implementation method of the above-mentioned embodiment of the information processing method executed by the first communication device is applicable to this method, and the same technical effect can also be achieved.

It should also be noted that, the information processing method provided in the embodiments of the present application may be executed by an information processing apparatus, or a control module in the information processing apparatus for executing the information processing method. In the embodiments of this application, that the information processing apparatus performs and loads the information processing method is used as an example to describe the information processing method provided in the embodiments of this application.

As shown in FIG. 9, an information processing apparatus according to an embodiment of the present application includes:

a third sending module 910, configured to send a first request, where the first request is used for subscribing to address information of an edge configuration server, or querying the stored address information of the edge configuration server; and a third receiving module 920, configured to receive the address information of the edge configuration server fed back according to the first request.

In some implementations, the third communication device is a policy control function PCF; and the apparatus further includes:

a determining module, configured to determine a rule for a user equipment routing policy, where the user equipment routing policy is used for at least one of the following:

matching application traffic from a client of the user equipment to the edge configuration server;

establishing a protocol data unit session from the client of the user equipment to the edge configuration server; and establishing an application connection from the client of the user equipment to the edge configuration server.

In some implementations, the rule for the user equipment routing policy includes at least one of the following:

a DNN;

S-NSSAI; and address information of the edge configuration server.

In some implementations, the apparatus further includes:

a fifth sending module, configured to send the rule for the user equipment routing policy to the user equipment.

In some implementations, the user equipment has an enhanced kernel capability;

where the enhanced kernel capability indicates that the user equipment supports sending, to an application client on the user equipment, information obtained from a NAS or an AS.

In some implementations, the apparatus further includes:

a fourth receiving module, configured to receive an AF request, where the AF request carries the address information of the edge configuration server.

In some implementations, the third communication device is a SMF; and the apparatus further includes:

a fifth sending module, configured to send the address information of the edge configuration server to the user equipment.

The apparatus sends the first request to the second communication device, and receives the address information of the ECS fed back by the second communication device according to the first request. In this way, even if an ECS is deployed according to a region or an ECS is provided by a third party, the UE can establish an application layer connection with the ECS based on the address information of the ECS provided by the first communication device, so that the ECS obtains the address of the EES, and then the UE establishes an application layer connection with the EES, interacts to obtain the address of the EAS, and establishes an application layer connection.

The information processing apparatus provided in the embodiments of the present application can implement various processes implemented by the third communication device in the method embodiments in FIG. 3, FIG. 4, and FIG. 8, and details are not repeated here to avoid repetition.

Figure 10:
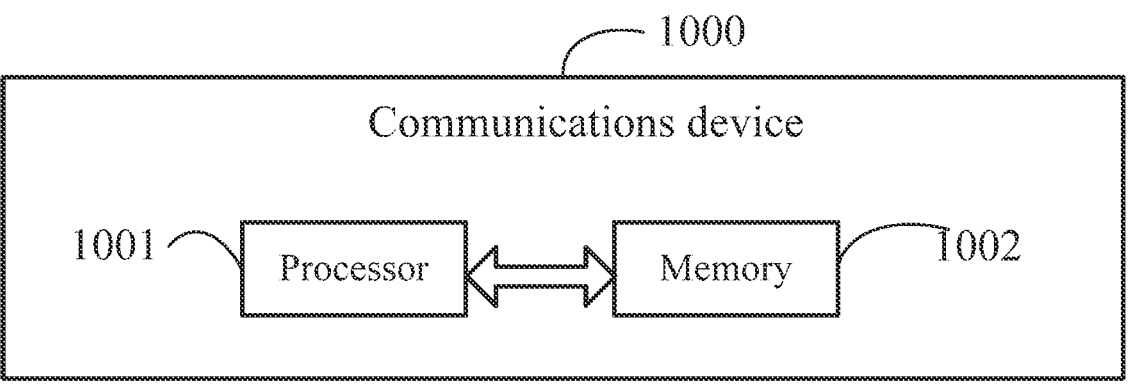
FIG. 10 is a structural diagram of a communication device according to an embodiment of this application.

In some implementations, as shown in FIG. 10, the embodiments of the present application further provide a communication device, including a processor 1001, a memory 1002, and a program or an instruction stored in the memory 1002 and executable on the processor 1001. When the program or instruction is executed by the processor 1001, the various processes of embodiments of the information processing method executed by the first communication device, or the information processing method executed by the second communication device, or the information processing method executed by the third communication device are performed, and the same technical effect can be achieved. To avoid repetition, details are not repeated herein.

Figure 11:
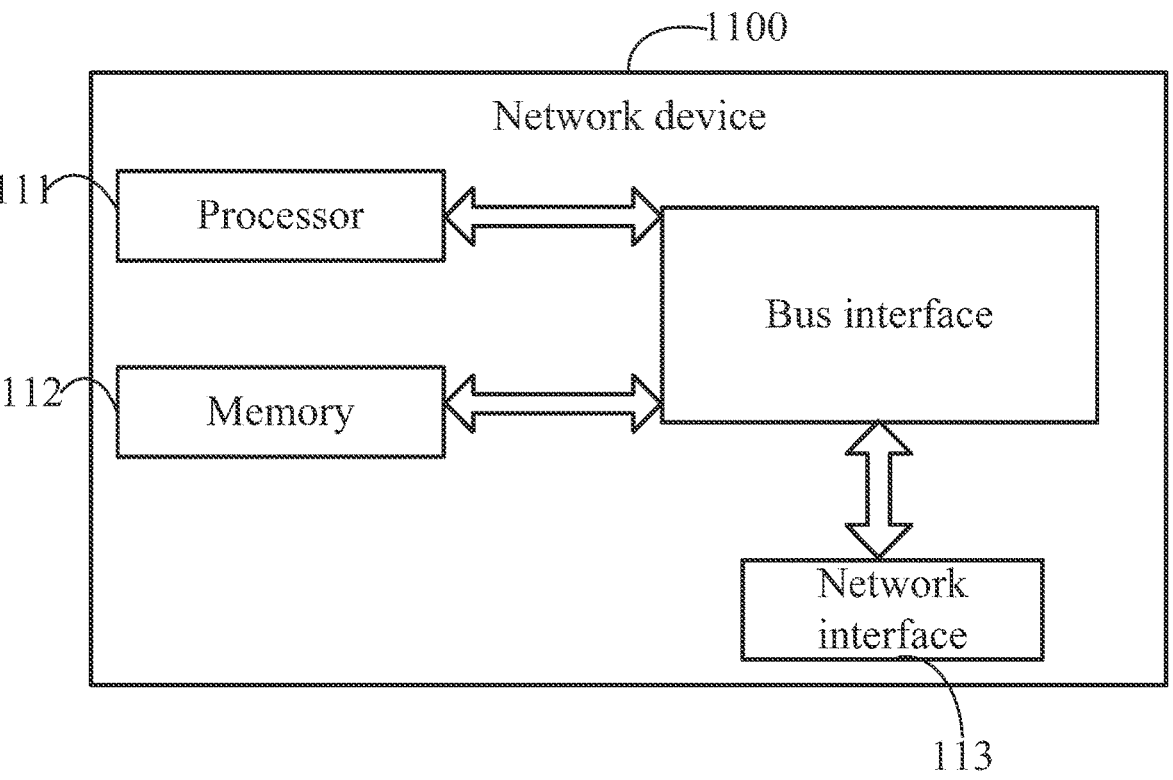
FIG. 11 is a structural diagram of a network device according to an embodiment of the present application.

In some implementations, an embodiment of this application further provides a network device. As shown in FIG. 11, the network device 1100 includes: a processor 111 and a memory 112.

As shown in FIG. 11, one chip is, for example, the processor 111, which is connected to the memory 112, so as to invoke a program in the memory 112 to perform operations of the network device shown in the foregoing method embodiment.

The network device may further include a network interface 113 for exchanging information, such as a Common Public Radio Interface (CPRI).

In some implementations, the network side device in this embodiment of the present disclosure further includes: an instruction or a program stored on the memory 112 and executable on the processor 111, and the processor 111 invokes the instruction or program in the memory 112 to execute the method executed by each module shown in FIG. 5, FIG. 7, or FIG. 9, and achieve the same technical effect. To avoid repetition, details are not described herein again.

The embodiments of the present application further provide a readable storage medium, the readable storage medium may be non-volatile or volatile, and a program or an instruction is stored on the readable storage medium, and when the program or instruction is executed by a processor, the various processes of embodiments of the information processing method performed by the first communication device, or the information processing method performed by the second communication device, or the information processing method performed by the third communication device are performed, and the same technical effect can be achieved. To avoid repetition, details are not repeated herein.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

The embodiments of the present application further provide a chip, the chip includes a processor and a communication interface, the communication interface is coupled to the processor, and the processor is configured to run programs or instructions to implement the various processes of embodiments of the information processing method performed by the first communication device, or the information processing method performed by the second communication device, or the information processing method performed by the third communication device, and can achieve the same technical effect. To avoid repetition, details are not repeated herein.

It should be understood that the chip mentioned in this embodiment of this application may also be referred to as a system-level chip, a system chip, a chip system, or an on-chip system chip.

The embodiments of the present application further provide a computer program product, the computer program product is stored in a non-transient storage medium, and the computer program product is executed by at least one processor to implement the various processes of embodiments of the information processing method performed by the first communication device, or the information processing method performed by the second communication device, or the information processing method performed by the third communication device, and the same technical effects can be achieved. To avoid repetition, details are not described herein again.

It should be noted that in this specification, the term "include," "comprise," or any other variant is intended to cover a non-exclusive inclusion, so that a process, method, article, or apparatus that includes a series of elements includes not only those elements but also other elements that are not explicitly listed, or includes elements inherent to such a process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may clearly understand that the method in the foregoing embodiments may be implemented by software in addition to a necessary universal hardware platform or by hardware only. Based on such an understanding, the technical solutions of this application essentially or the part contributing to the related art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described above in conjunction with the accompanying drawings, but this application is not limited to the above specific implementations, and the above specific implementations are only illustrative and not restrictive. Enlightened by this application, a person of ordinary skill in the art can make many forms without departing from the purpose of this application and the protection scope of the claims, all of which shall fall within the protection of this application.

The invention claimed is:

1. An information processing method, performed by a first communication device and comprising:

sending address information of an edge configuration server (ECS) to a second communication device, wherein the edge configuration server is configured to provide an address of an Edge Enabler Server (EES) to an Edge Enabler Client (EEC) of user equipment, wherein sending the address information of the edge configuration server (ECS) to the second communication device comprises:

when a third communication device initiates a subscription request to a Unified Data Management (UDM) to subscribe to the address information of the edge configuration server and an Application Function (AF) is authorized by a Network Exposure Function (NEF) to provision the address information of the edge configuration server, or when the AF subscribes to location information of the user equipment, sending by the AF the address information of the edge configuration server to the NEF through service information of the NEF; or sending, by the NEF the address information of the edge configuration server to the UDM through service information of the UDM.

2. The information processing method according to claim 1, wherein sending the address information of the edge configuration server to the second communication device comprises:

sending the address information of the edge configuration server according to the location information of the user equipment or a change of the location information of the user equipment.

3. The information processing method according to claim 2, wherein before sending the address information of the edge configuration server according to the location information of the user equipment or the change of the location information of the user equipment, the information processing method further comprises:

subscribing to the location information of the user equipment.

4. The information processing method according to claim 2, wherein the location information of the user equipment comprises at least one of the following:

a data network access identifier;

a cell identifier; or a tracking area identifier.

5. The information processing method according to claim 1, wherein the address information of the edge configuration server comprises at least one of the following:

a fully qualified domain name of the edge configuration server;

an Internet Protocol address of the edge configuration server;

a port number of the edge configuration server; or a uniform resource locator of the edge configuration server.

6. The information processing method according to claim 1, further comprising:

sending a data network access identifier corresponding to the address information of the edge configuration server.

7. An information processing method, performed by a second communication device and comprising:

receiving address information of an edge configuration server (ECS) from a first communication device, wherein the edge configuration server is configured to provide an address of an Edge Enabler Server (EES) to an Edge Enabler Client (EEC) of user equipment; and sending the address information of the edge configuration server to a third communication device, wherein receiving the address information of the edge configuration server (ECS) from the first communication device comprises:

when the third communication device initiates a subscription request to a Unified Data Management (UDM) to subscribe to the address information of the edge configuration server and an Application Function (AF) is authorized by a Network Exposure Function (NEF) to provision the address information of the edge configuration server, or when the AF subscribes to location information of the user equipment receiving, by the NEF, the address information of the edge configuration server from the AF through service information of the NEF; or receiving, by the UDM, the address information of the edge configuration server from the NEF through service information of the UDM.

8. The information processing method according to claim 7, wherein before sending the address information of the edge configuration server, the information processing method further comprises:

receiving a first request, wherein the first request is used for subscribing to the address information of the edge configuration server, or querying stored address information of the edge configuration server.

9. The information processing method according to claim 8, wherein the first request is a query request, and the sending address information of the edge configuration server comprises:

sending the address information of the edge configuration server according to the query request.

10. The information processing method according to claim 8, wherein the first request is a subscription request, and the subscription request is used for subscribing to the address information of the edge configuration server, and wherein the subscription request comprises at least one of the following:

the address information of the edge configuration server; or the location information of the user equipment.

11. The information processing method according to claim 10, wherein sending the address information of the edge configuration server comprises at least one of the following:

sending all currently known address information of the edge configuration server when receiving the subscription request;

sending, when receiving the subscription request, the address information of the edge configuration server that matches the subscription request, wherein the subscription request is matching the location information of the user equipment in the subscription request;

after receiving the subscription request, when the address information of the edge configuration server changes, sending the changed address information of the edge configuration server; or after receiving the subscription request, when the location information of the user equipment changes, sending the address information of the edge configuration server that matches a current location of the user equipment.

12. The information processing method according to claim 7, wherein the address information of the edge configuration server is associated with a data network access identifier.

13. The information processing method according to claim 7, wherein the receiving address information of an edge configuration server comprises:

receiving an AF request, wherein the AF request carries the address information of the edge configuration server, and wherein the sending address information of the edge configuration server comprises:

sending the AF request.

14. The information processing method according to claim 7, wherein after receiving the address information of the edge configuration server, the information processing method further comprises:

storing the received address information of the edge configuration server.

15. An information processing method, performed by a third communication device and comprising:

sending a first request to a second communication device, wherein the first request is used for subscribing to address information of an edge configuration server (ECS), or querying stored address information of the edge configuration server, wherein the edge configuration server is configured to provide an address of an Edge Enabler Server (EES) to an Edge Enabler Client (EEC) of user equipment; and receiving the address information of the edge configuration server fed back by the second communication device according to the first request, wherein the address information of the edge configuration server is obtained by the second communication device from a first communication device, and wherein the second communication device obtains the address information of the edge configuration server (ECS) form the first communication device at least by:

when the third communication device initiates a subscription request to a Unified Data Management (UDM) to subscribe to the address information of the edge configuration server and an Application Function (AF) is authorized by a Network Exposure Function (NEF) to provision the address information of the edge configuration server, or when the AF subscribes to location information of the user equipment, receiving, by the NEF, the address information of the edge configuration server from the AF through service information of the NEF; or receiving, by the UDM, the address information of the edge configuration server from the NEF through service information of the UDM.

16. The information processing method according to claim 15, wherein the third communication device is a Policy Control Function (PCF), and wherein after receiving the address information of the edge configuration server fed back according to the first request, the information processing method further comprises:

determining a rule for a user equipment routing policy, wherein the user equipment routing policy is used for at least one of the following:

matching application traffic from a client of the user equipment to the edge configuration server;

establishing a protocol data unit session from the client of the user equipment to the edge configuration server; or establishing an application connection from the client of the user equipment to the edge configuration server.

17. The information processing method according to claim 16, wherein the rule for the user equipment routing policy comprises at least one of the following:

a Data Network Name (DNN);

Single Network Slice Selection Assistance Information (S-NSSAI); or the address information of the edge configuration server.

18. The information processing method according to claim 16, wherein after determining the rule for the user equipment routing policy, the information processing method further comprises:

sending the rule for the user equipment routing policy to the user equipment, wherein the user equipment has an enhanced kernel capability, and wherein the enhanced kernel capability indicates that the user equipment supports sending, to an application client on the user equipment, information obtained from a Non-Access Stratum (NAS) or an Access Stratum (AS).

19. The information processing method according to claim 16, wherein before determining the rule for the user equipment routing policy, the information processing method further comprises:

receiving an AF request, wherein the AF request carries the address information of the edge configuration server.

20. The information processing method according to claim 15, wherein the third communication device is a Session Management Function (SMF), and wherein after receiving the address information of the edge configuration server fed back according to the first request, the information processing method further comprises:

sending the address information of the edge configuration server to the user equipment.

* * * * *